United States Patent [19]

Buchter

[11] Patent Number: 4,981,449

[45] Date of Patent: Jan. 1, 1991

[54] CONNECTOR FOR MATING MULTI-LAYER BLADE-SHAPED MEMBERS

[75] Inventor: Randolph L. Buchter, Harrisburg, Pa.

[73] Assignee: AMP Incorporated, Harrisburg, Pa.

[21] Appl. No.: 515,816

[22] Filed: Apr. 27, 1990

[51] Int. Cl.[5] ...................... H02G 5/00; H01R 13/115

[52] U.S. Cl. .................................. 439/724; 174/71 B; 174/88 B; 439/213; 439/668

[58] Field of Search ............... 439/723, 724, 115, 856, 439/857, 786, 787, 668, 210–213; 174/70 B, 71 B, 72 B, 88 B

[56] References Cited

U.S. PATENT DOCUMENTS

| | | | |
|---|---|---|---|
| 3,149,893 | 9/1964 | Dupre | 339/14 |
| 3,559,148 | 1/1971 | Hafer | 439/115 |
| 3,778,753 | 12/1973 | Occhipinti et al. | 339/156 R |
| 4,220,382 | 9/1980 | Ritchie et al. | 339/17 LM |
| 4,462,657 | 7/1984 | Snowdon et al. | 439/724 |
| 4,637,677 | 1/1987 | Barkus | 439/787 |
| 4,659,155 | 4/1987 | Walkup et al. | 339/14 R |
| 4,660,920 | 4/1987 | Shibano | 439/724 |
| 4,684,191 | 8/1987 | Feher et al. | 439/246 |
| 4,747,790 | 5/1988 | Masuda et al. | 439/631 |
| 4,845,589 | 7/1989 | Weidler et al. | 361/342 |
| 4,867,696 | 9/1989 | Demler, Jr. et al. | 439/212 |
| 4,878,862 | 11/1989 | Wise | 439/787 |
| 4,886,940 | 12/1989 | Gagnon et al. | 439/213 |

*Primary Examiner*—Neil Abrams
*Attorney, Agent, or Firm*—Katherine A. Nelson

[57] ABSTRACT

An electrical connector 10 for mating two blade-shaped members, each having opposed first and second sides and an edge-proximate portion extending outwardly intermediate the first and second sides thereof includes first and second opposed dielectric housing members 14,14; first and second outer terminal elements 50,70 secured to the inner major surface of each of the first and second housing members 14,14 defining associated pairs of opposed spaced first and second outer terminal elements 50,70; a pair of opposed inner terminal elements 86 disposed between respective and electrically isolated from first and second outer elements 50,70; means 38 securing the pair of opposed inner terminal elements 86 to and between the first and second housing members 14,14; and means 46 securing the first and second housing members 14,14 together. Each outer and inner terminal element 50,70,86 includes respective arrays of contact arms extending outwardly from opposed edges thereof. The arrays of contact arms of the outer terminal elements 50,70 form extended first and second blade receiving receptacles and the arrays of inner terminal element 86 define third and fourth blade receiving receptacles 106,108 spaced inwardly from the first and second receptacles. Upon mating connector 10 with blade-shaped members 110,130, the first and second receptacles 66,68 electrically interconnect respective first and second sides 112,132;120,140 of the blade-shaped members 110,130 and the third and fourth receptacles 106,108 electrically interconnect the edge-proximate portions 116,136 of the blade-shaped members 110,130.

10 Claims, 5 Drawing Sheets

CONNECTOR FOR MATING MULTI-LAYER BLADE-SHAPED MEMBERS

FIELD OF THE INVENTION

This invention related to the field of electrical connectors and more particularly to an electrical connector for interconnecting to blade-shaped members.

BACKGROUND OF THE INVENTION

In forming a power distribution system it is necessary to provide means for a hot line carrying power to the required load and a return line to the power source. A plurality of interconnections are typically required on a power distribution system for an integrated circuit logic system. There are connections between the power supply and bus bar, bus bar and a mother board, mother board and the daughter board, and connections between the daughter board and the socket in which chips are usually mounted and a connection between the socket and an actual integrated circuit. For each point of interconnection in the line going from the hot terminal to the load there is another point of interconnection to complete the return line of the circuit. Furthermore, in many integrated circuit systems there can be no more than 250 millivolts of drop in the voltage at each load. In addition, some logic systems require multiple voltage power distribution systems. These systems, therefore, require electrical connectors or contacts that will minimize voltage drops as the load is placed on the system.

To help increase the operating speed, power distribution systems are often designed to use a laminated busbar wherein the hot and return conductors are placed in close proximity separated by a thin insulative layer. In addition, some applications require the use of three phase systems or multi-voltage bus bars. One problem associated with laminated bus bars, however, is the inability to use standard two sided receptacle contacts to interconnect the laminated bus bar with another or to terminate to the laminated bus bar since a standard contact will electrically short the outer most conductive layers of the bus bar. Typically interconnections to laminated bus bars are made by providing the bus bar layers with tabs that extend outwardly from the various layers to which a wire or contact may be bolted to one voltage or layer. Since the wide bus bars are good conductors of heat as well as electricity, it is extremely difficult to achieve effective connections to the bus bar by soldering techniques. It is desirable to have a separate means for connecting to the laminated bus bar system that retains the "pluggability" of the system.

SUMMARY OF THE INVENTION

Accordingly, to alleviate the disadvantages and deficiencies of the prior art the present invention is directed to an electrical connector for mating two blade-shaped members, each having opposed first and second sides and an edge-proximate portion extending outwardly intermediate said first and second sides thereof. The connector includes first and second opposed dielectric housing members, at least a first outer terminal element secured to the inner major surface of each of first and second housing members, a pair of opposed inner terminal elements disposed between respective said opposed first outer elements and electrically isolated therefrom, means securing the pair of opposed inner terminal elements to and between the first and second housing members, and means securing the first and second housing members together. The first and second housing members together define first and second cavity means for receiving first and second electrical articles respectively and in the assembled connector the outer terminal elements define a pair of opposed spaced first outer terminal elements.

Each first outer terminal element includes a body section having first and second arrays of cantilevered spring contact arms extending outwardly from respective leading and trailing edges thereof. The contact arms of both the first and second arrays of each first terminal element extends to respective free ends outwardly from the plane of the respective body section toward the other first terminal element. The first and second arrays of both the first outer terminal elements define first and second blade-receiving receptacles respectively therebetween.

Each inner terminal element has a shorter axial length than that of a first terminal element and includes a body section having third and fourth arrays of cantilevered spring contact arms extending outwardly from respective leading and trailing edges thereof. The contact arms of both the third and fourth arrays of each inner terminal element extends to respective free ends and toward the contact arms of the third and fourth arrays respectively of the other inner terminal element and define third and fourth blade-receiving receptacles respectively therebetween. The third and fourth blade-receiving receptacles are located axially inwardly of the first and second blade-receiving receptacles. Upon assembling the connector by securing the housing members together and mating the connector with first and second blade-shaped members, the blade-shaped members deflect the contact arms outwardly against the spring bias of the arms. The opposed first and second spring contact arm free ends engage the first and second blade-shaped members at a plurality of outer edge-remote locations along the first and second sides thereof and interconnecting the edge-proximate locations of the first and second blade-shaped members. The pluralities of current paths lower resistance through the interface.

In the preferred embodiment, the connector further includes a second outer terminal element secured to each respective housing member inwardly of the associated first terminal element. The second outer terminal elements are configured in the same manner as the first outer terminal elements, however, they have a shorter axial length than the corresponding first outer terminal elements and a longer axial length than the associated pair of inner terminal elements. The second outer terminal elements have fifth and sixth arrays of contact arms, the free ends of which are disposed substantially coplanar with those of the associated first and second arrays respectively and are located axially inwardly therefrom. The contact arms of the second outer terminal elements thereby extend the first and second blade-receiving receptacles and provide a further plurality of current paths between respective first and second sides of the first and second electrical articles. Preferably a layer of dielectric material is placed between the associated first and second outer terminal elements to electrically isolate the current paths of the first outer terminal element from those provided by the second outer terminal element thereby providing isolated parallel paths. In addition, if desired, a dielectric spacing layer may be placed between the pair of inner terminal elements to provide isolated parallel current paths between the corresponding edge-proximate portions of the first and second electrical articles, or isolated current paths for an outwardly extending portion that is bipolar.

The invention itself, together with further objects and its attendant advantages will be best understood by reference to the following detailed description taken in conjunction with the accompanying drawing.

DETAILED DESCRIPTION OF THE DRAWING

Figure 1:
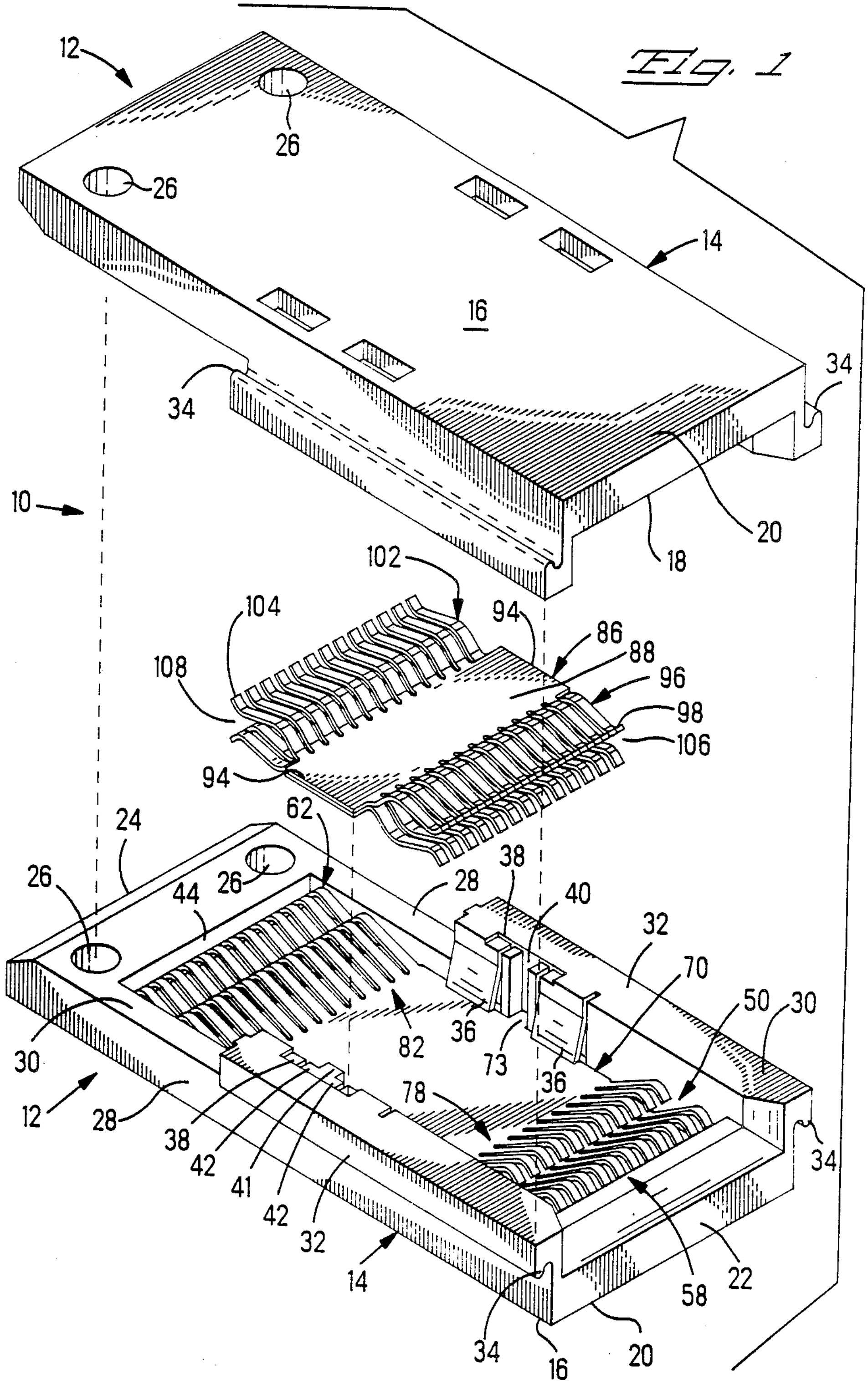
FIG. 1 is a partially exploded view of a connector made in accordance with the invention.
Figure 2:
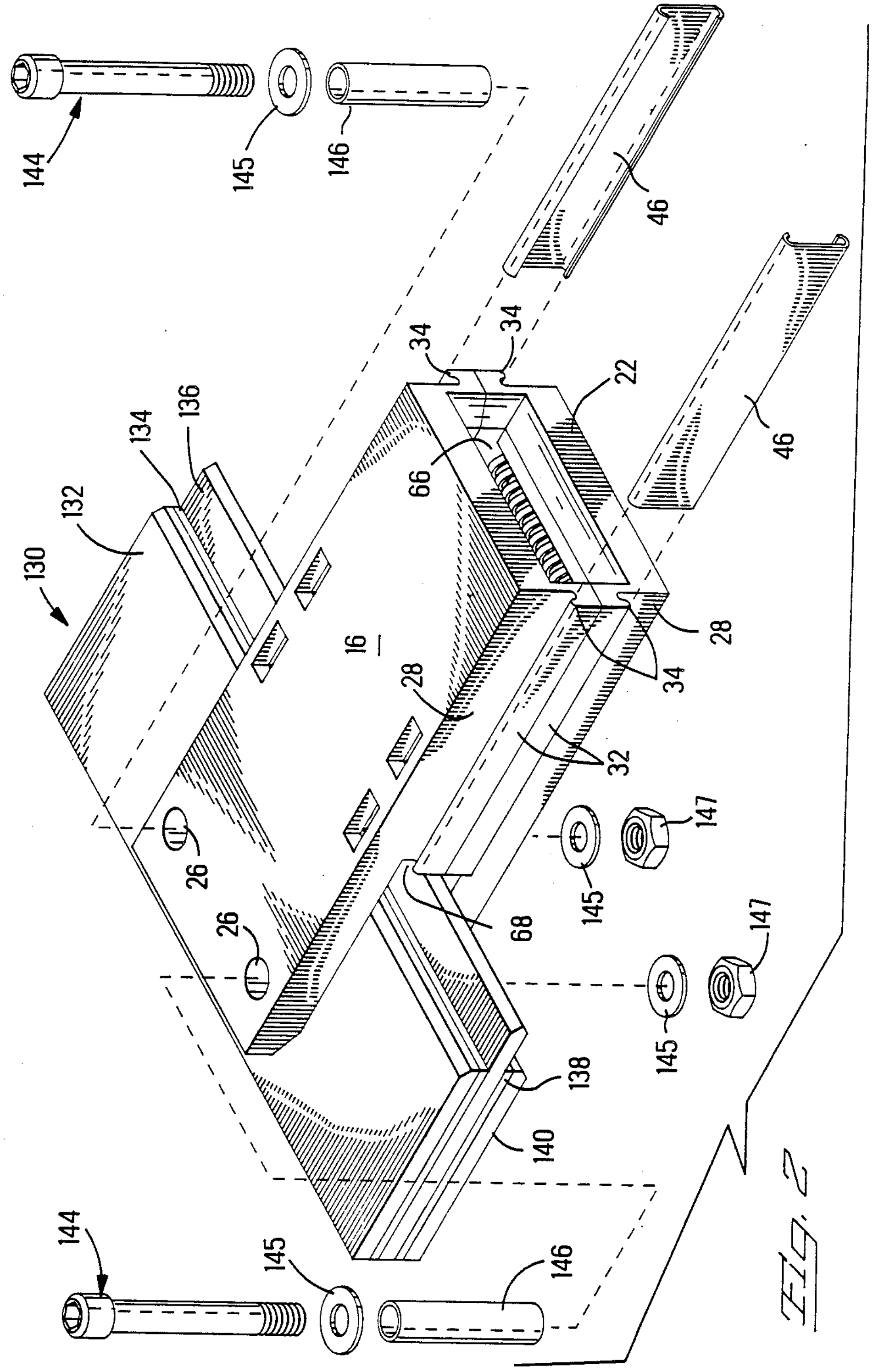
FIG. 2 is a perspective view of a partially assembled connector mated to a blade-shaped member with mounting and securing means exploded therefrom.
Figure 3:
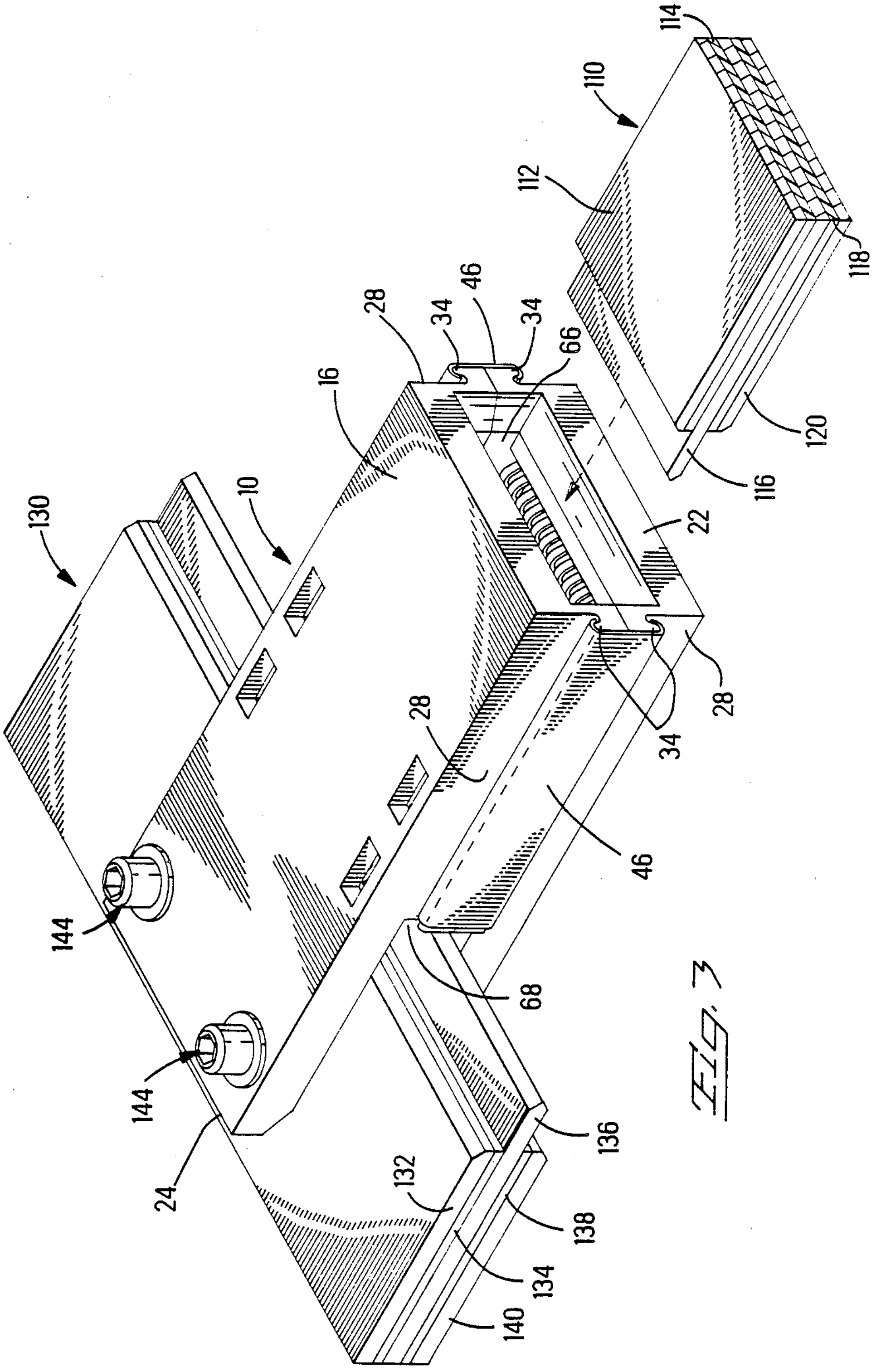
FIG. 3 is a perspective view of an assembled connector of FIG. 2 with a second blade-shaped member aligned for mating with the connector.
Figure 4:
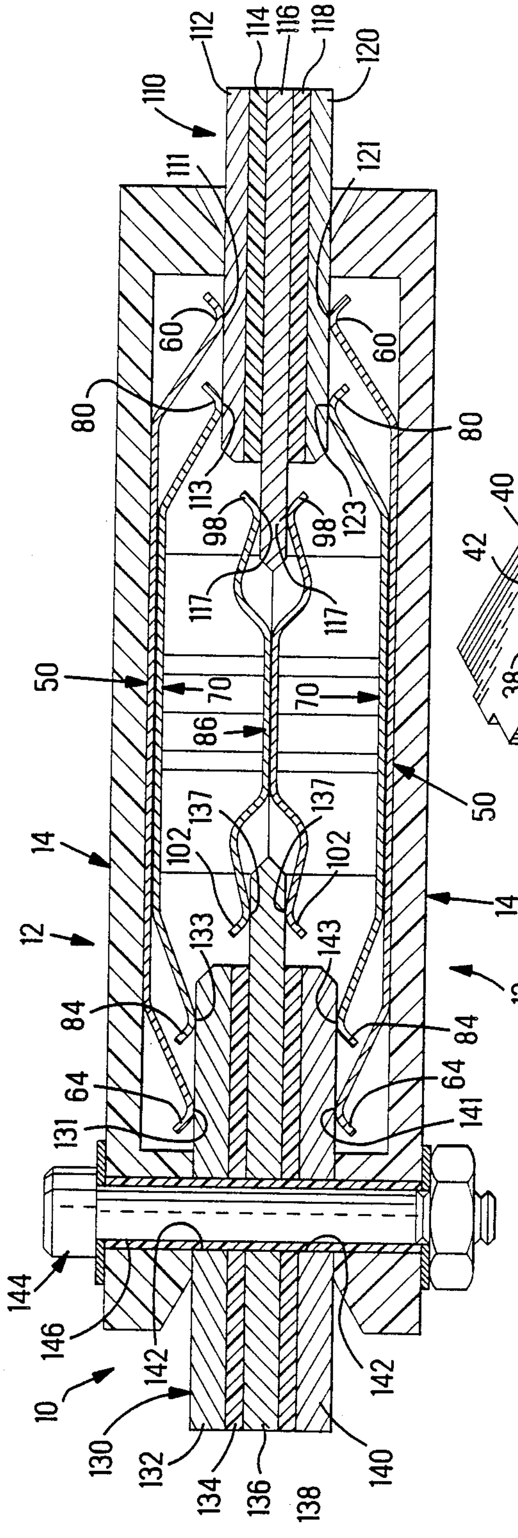
FIG. 4 is a longitudinal sectional view of the assembled connector mated to two blade-shaped members.
Figure 5:
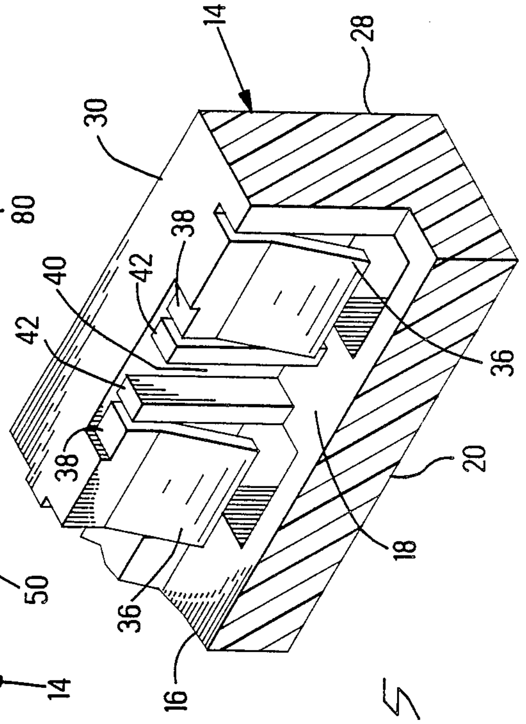
FIG. 5 is an enlarged fragmentary view of the inner terminal support means and latching area of the sidewall connector of FIG. 1.

Referring now to FIGS. 1 through 4, connector 10 is comprised of two subassemblies 12, each subassembly including a housing member 14 having first and second outer terminal elements 50, 70 secured therein and a pair of inner terminal elements 86 centrally located and secured between the two subassemblies. As best seen in FIGS. 1 and 4 housing member 14 includes a base 16, leading and trailing ends 22, 24 and opposed upwardly standing side walls 28 which together define terminal receiving cavity 44. Base 16 includes inner and outer surfaces 18, 20 respectively. Side walls 28 include upper surfaces 30 and an outwardly extending flange portion 32 having a lip 34. As best seen in FIGS. 2 and 3 the subassemblies 12 are secured together with inner terminal element 86 secured therebetween by means of rail-like members 46 having curved edges 48 adapted cooperate with the lip portions 34 of outwardly extending flanges 32 of subassemblies 12.

Figures 6, 7, 8, 9:
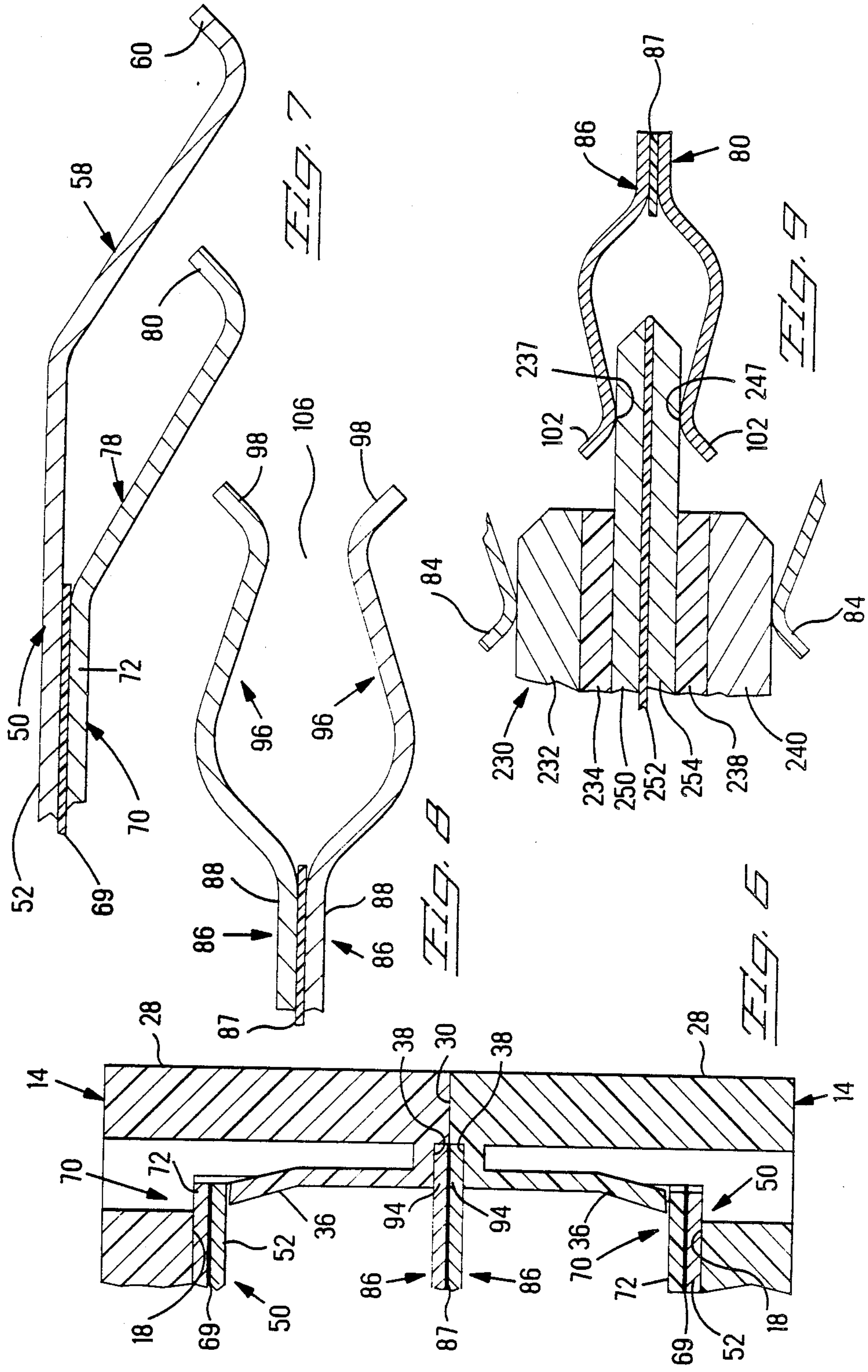
FIG. 6 is an enlarged cross-sectional view of the latch area of the assembled connector illustrating the means for securing, the inner and outer terminal elements in connector of FIG. 2.
FIG. 7 is an enlarged sectional view of the outer terminal elements of connector of FIG. 2.
FIG. 8 is an enlarged fragmentary view of the inner terminal element pair of the connector of FIG. 2.
FIG. 9 is a fragmentary enlarged view illustrating the inner terminal elements of the connector of FIG. 1 electrically connected to a multi-layer blade-shaped member.

Side walls 28 also include a plurality of latches 36 that secure the associated first and second outer terminal elements 50, 70 in their respective housing cavities 44. Each side wall 28 further includes terminal receiving recess 38, which extends axially along a part of the innermost upper edge of respective side walls 28 proximate the longitudinal center of the terminal receiving cavity 44. The recesses 38 are dimensioned to receive a corresponding outwardly extending portion 94 of the inner terminal elements 86 in the assembled connector 10, as best seen in FIG. 6. Side walls 28 further include outer terminal locating means including recess 40 on one side, which extends from upper surface 30 to the inner surface 18 of base 16 and is defined by inwardly extending posts 44 and projection 41 on other wall 28′. Downwardly extending recess portion 40 provides a means for receiving outward extending flanges and projection 41 engages inwardly directed notches (not shown) of first and second outer terminal elements thereby positioning outer terminal elements 50, 70 within cavity 44. Flange 73 of second outer terminal member 70 is seen in FIG. 1.

Referring now to FIGS. 1, 4 and 7 first inner terminal element 50 is comprised of a body portion 52, a first array 58 of compliant contact beam arms extending from leading edge and a second array 62 of compliant contact arms beam extending outwardly from a trailing edge. The compliant beam arms extend to contact areas at free ends 60, 64 respectively. In the assembled connector 10, the opposed first outer terminal elements 50 form blade receiving receptacle 66 at the leading end and 68 at the trailing end thereof as seen in FIG. 4. Each inner terminal element 86, as shown in Figures 1, 4 and 8, includes body portion 88 having third and fourth arrays 96, 102 of compliant contact arms extending from leading and trailing edges thereof. Body sections 88 further include outwardly extending portions 94 which are dimensioned to be received in shallow recesses 38 of housing walls 28 as previously described and as shown in FIG. 6.

As shown in Figure 1, the third and fourth arrays 96, 102 of contact arms extend outwardly from body portion 88 of inner terminal elements 86 such that the free ends 98, 104 of third and fourth arrays 96, 102 form third blade-receiving receptacle 106 at the forward end and fourth blade-receiving receptacle 108 at the trailing end thereof. As is seen in FIG. 8, inner terminal elements 86 may be electrically insulated from each other by insulating means 87.

The preferred embodiment of the invention further includes a second outer terminal element 70 secured in each subassembly 12 adjacent the respective first outer terminal element 50. Second outer terminal element 70 has a body portion 72 and fifth and sixth arrays 78, 82 of compliant contact beam arms extending outwardly from opposed edges thereof. In assembling the preferred embodiment of subassembly 12, the second outer terminal element 70 is disposed inwardly of the first outer terminal element 50 and in the preferred embodiment is insulated therefrom by an insulating means 69 as best seen in FIG. 7. In the assembled subassembly 12, the fifth arrays 78 are proximate and associated with the first arrays 58 and the sixth arrays 82 are proximate and associated with the second arrays 72. The respective body portions 52 of the first outer terminal elements 50 are longer than the corresponding body portions 72 of the second outer terminal elements 70 so that the spring arms of the fifth and sixth arrays lie inwardly of the spring contact arms of the first and second arrays.

As shown in FIG. 4, the free ends 80 of the respective fifth arrays 78 are disposed substantially coplanar with the respective free ends 60 of the associated first arrays 60 and are located axially inwardly therefrom to extend the first blade receiving receptacle 66. Similarly the free ends 84 of the sixth array 82 are disposed substantially coplanar with the free ends 64 of the second arrays 62 and are located axially inwardly therefrom, thereby extending the second blade receiving receptacle 68. As can be seen in FIG. 1, a protrusion 73 extending from body 72 of second outer terminal element 70 is disposed between upwardly extending posts 42 of housing 14 and locates second outer terminal element 70 within the cavity 44. A similar extension (not shown) is present on the first outer terminal element as well. As also shown in FIGS. 1 and 6, the ends of latches 36 extend outwardly along part of the body portion 52, 72 of first and second outer terminal elements 50, 70 to hold the terminal elements 50, 70 securely within respective cavities 44 of housing 14. Further details of the housing and terminal structures are disclosed in U.S. patent application Ser. No. 07/515,980 filed concomitantly herewith and herein incorporated by reference.

As best seen in FIG. 6 the structure of the housing members 14 and the latch members 36 in combination with shallow recess 38 and elongated recess 40 hold the various outer and inner terminal elements 50, 70;86 respectively in position within the connector 10 and electrically isolated from one another. FIGS. 7 and 8 show enlarged fragmentary portions of the first and second outer terminal elements 50, 70 and the pair of inner terminal elements 86 electrically isolated from each other by their respective insulating means 69, 87.

FIG. 4 shows first and second blade-shaped members 110, 130 inserted into the assembled connector 10 and electrically engage with corresponding contact arms within the connector. The first blade-shaped member 110 includes a first side 112, middle blade-shaped member 116 has an outwardly extending portion and a second side 120, the three conductive members being isolated from each other by insulating layer 114 and 118 respectively. The second blade-shaped member is comprised of three conductive layers including on first side conductor 132, an outwardly extending conductive portion 136 and a second side conductor 140 insulated by means 134 and 138 to provide electrical isolation among the three conductive members. FIG. 4 shows a conductor embodiment 10 in electrical engagement with first and second blade shape members 110 and 130 respectively. A three level bus bar member or grounded circuit board member may be used in a three phase system or to provide multiple voltages to a system.

In the embodiment shown connector 10 is mounted to second electrical article shown as blade-shaped member 130 by mounting means 144 as shown in FIGS. 2, 3 and 4, the blade-shaped member 130 includes aperture 142 extending therethrough for receiving insulated mounting means 144. To maintain electrical isolation among the conductive elements of the respective blade-shaped members and the terminal elements, an insulating sleeve 146 is disposed around members 144. On mating the connector 10 with blade-shaped members !10 and 130, the free ends 60, 80 of the first and fifth arrays 58, 78 of outer terminal elements 50, 70 engage the first blade-shaped member 110 at a plurality of outer and inner locations 111, 113 on a first side 112 and at outer and inner locations 121, 123 of the second side 120 respectively thereof. Similarly the free ends 64, 84 of the second and sixth arrays 62, 82 respectively engage the second blade-shaped member 130 at a plurality of outer and inner locations 131, 133 along the first side thereof and at outer and inner locations 141, 143 along second sides thereof as is best seen in FIG. 4. The free ends 98, 104 of the third and fourth arrays 96, 102 of inner terminal element 86 respectively engage the outwardly extending members 116, 136 of the first and second blade-shaped members 110, 130 respectively at a plurality of locations 117, 137.

FIG. 9 illustrates the use of the connector of the instant invention with a multi-layer blade-shaped member 230 having four conductive layers 232, 250, 254, 240 electrically isolated by dielectric layers 234, 252 and 238 respectively. The outward projecting portion includes conductive layers 250, 254 and dielectric layer 252. Inner terminal members 86 are insulated by means 87 and respective ends 102 of contact arms engage conductive layer 250 and 254 and 237, 247 respectively.

Terminal elements 50, 70 and 86 are preferably stamped and formed members made from a conductive material having the desired mechanical properties, and in particular low stress relaxation. Suitable materials include copper alloys, such as Olin C-151 available from Olin Brass, East Alton, Ill. C-151 has 85% to 95% of the conductivity of pure copper yet retains very good mechanical properties such as tensile strength and low relaxation under stress. The number of contact arms formed on each terminal element depends upon the width of the terminal body and the bar shaped member as well as the amount of current to be carried by the system. The resistance at the interface is lowered and the normal force required per contact arm is lowered by using a plurality of contact arms. In the preferred method of making terminal elements 50 and 70, a plurality of contact arms are formed on opposing sides of a continuous strip of metal. Individual terminal elements having a desired number of contact arms are severed from the strip the center of the strip becoming the body of the terminal element with the notches and protrusions for positioning terminal elements being cut during the severing process. Since, as shown in FIG. 1, terminal elements 86 include outwardly extending projections 94 along both side edges of the body portion, the terminal element 86 is preferably made by severing selected contact arms from a continuous strip, to form the projections 94 upon severing respective elements 86.

A suitable insulting material for insulation means 69 includes flexible material such as MYLAR available from E. I. DuPont de Nemours and Company and other materials as known in the art. In the preferred embodiment dielectric housing member 14 is molded from a glass filled polyetherimide available from G. E. Plastics, Pittsfield, Mass. under the trade name ULTEM 2300. Other materials known in the art to be stable at high temperatures and non-hydroscopic are also suitable.

As can be seen from the Figures, the present invention provides an electrical connector having an assembly of terminal elements that can carry high currents of more than one voltage or signal and ground circuits across an interface. The present invention further allows the replacement of a plurality of single voltage bus bars by a multi-voltage laminated bus bar. While the connector is shown mated to multi-layer bus bar members, it is to be understood that the blade-shaped members may be portions of circuit boards having conductors on opposed sides thereof and a center ground plane as well as blade-shaped members having a single voltage. The present invention also is suitable for use with circuit boards and the like.

It is thought that the electrical connector of the present invention and many of its attendant advantages will be understood from the foregoing description. Changes may be made in the form, construction and arrangement of parts thereof without departing from the spirit and scope of the invention or sacrificing all of its material advantages.

I claim:

1. An electrical connector for mating two blade-shaped members, each having opposed first and second sides and an edge-proximate portion extending outwardly intermediate said first and second sides, said connector comprising:

first and second opposed dielectric housing members, which together define first and second cavity means for receiving first and second electrical articles respectively, each said housing member including major inner and outer surfaces;

at least a first outer terminal element secured to said inner major surface of each of said first and second housing members defining a pair of opposed spaced first outer terminal elements;

a pair of opposed inner terminal elements disposed between respective said opposed first outer elements, said inner terminal elements being electrically isolated from said first outer terminal elements;

means securing said pair of opposed inner terminal elements to and between said first and second housing members; and means securing said first and second housing members together;

each said first outer terminal element including a body section having first and second arrays of cantilevered spring contact arms extending outwardly from respective leading and trailing edges thereof, said contact arms of both said first and second arrays of each said first terminal element extending to respective free ends outwardly from the plane of the respective said body section toward the other said first terminal element, said first and second arrays of both said first outer terminal elements defining first and second blade-receiving receptacles respectively therebetween;

each said inner terminal element having a shorter axial length than a said first terminal element and including a body section having third and fourth arrays of cantilevered spring contact arms extending outwardly from respective leading and trailing edges thereof, said contact arms of both said third and fourth arrays of each said inner terminal element extending to respective free ends outwardly from the plane of the respective said body section toward the other said inner terminal element and toward said contact arms of the third and fourth arrays respectively of the other said inner terminal element and defining third and fourth blade-receiving receptacles respectively therebetween, said third and fourth blade-receiving receptacles being located axially inwardly of said first and second blade-receiving receptacles; whereby upon said first and second housing members being secured together thereby defining said connector and mating said connector with first and second blade-shaped members and outward deflection against spring bias of all said contact arms by said blade-shaped members, said opposed first and second spring contact arm free ends engage said first and second blade-shaped members at a plurality of outer edge-remote locations along said first and second sides thereof and interconnecting said edge-proximate locations of said first and second blade-shaped members with all interconnecting along pluralities of current paths thereby lowering resistance.

2. The connector of claim 1 further including at least a second outer terminal element secured to each housing member, said first outer terminal element associated therewith being adjacent said housing member and said at least second outer terminal element disposed inwardly of said associated first outer terminal element.

3. The connector of claim 2 Wherein each said second outer terminal element includes a body section having fifth and sixth arrays of cantilevered spring contact arms extending outwardly from respective leading and trailing edges thereof, said contact arms of both said fifth and sixth arrays of each said second outer terminal element extending to respective free ends outwardly from the plane of the respective said body section toward the other said second outer terminal element, said fifth arrays being proximate and associated with said first arrays, and said sixth arrays being proximate and associated with said second arrays;

said spring contact arms of said fifth and sixth arrays being shorter than the corresponding spring contact arms of said first and second arrays such that the free ends of the contact arms of said fifth arrays are disposed substantially coplanar with those of the associated first arrays and located axially inwardly therefrom thereby extending said first blade-receiving receptacle, and the free ends of the contact arms of said sixth arrays are disposed substantially coplanar with those of the associated second arrays and located axially inwardly therefrom thereby extending said second blade-receiving receptacle.

4. The connector of claim 2 further including means insulating associated said first and second outer terminal elements from each other.

5. The connector of claim 1 further including means insulating said pair of opposed inner terminal elements from each other.

6. The connector of claim 2 further including means insulating said pair of opposed inner terminal elements from each other.

7. The connector of claim 5 wherein at least said edge-proximate portion of said blade-shaped members is bipolar and said inner terminal elements provide isolated electrical paths for respective sides of said edge-proximate portion.

8. The connector of claim 6 wherein at least said edge-proximate portion of said blade-shaped members is bipolar and said inner terminal elements provide isolated electrical paths for respective sides of said edge-proximate portion.

9. The connector of claim 1 wherein said means for securing said pair of inner terminal elements comprises a recessed portion extending along upper surfaces of opposed walls of said housing members, said recessed portions being adapted to receive outwardly extending portions of said opposed inner terminal elements.

10. The connector of claim 2 wherein said means for securing said pair of inner terminal elements comprises a recessed portion extending along upper surfaces of opposed walls of said housing members, said recessed portions being adapted to receive outwardly extending portions of said opposed inner terminal elements.

* * * * *